(12) United States Patent
Seth et al.

(10) Patent No.: US 9,117,250 B2
(45) Date of Patent: Aug. 25, 2015

(54) METHODS AND SYSTEMS FOR RECOMMENDING SOCIAL NETWORK CONNECTIONS

(75) Inventors: Anupam Seth, Urbana, IL (US); Allie K. Watfa, Urbana, IL (US); Dale Nussel, Mahomet, IL (US); Jonathan Kilroy, Champaign, IL (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/599,590

(22) Filed: Aug. 30, 2012

(65) Prior Publication Data

US 2014/0067817 A1  Mar. 6, 2014

(51) Int. Cl.
  *G06F 12/00* (2006.01)
  *G06F 15/16* (2006.01)
  *G06F 17/30* (2006.01)
  *G06Q 50/00* (2012.01)
  *H04W 4/20* (2009.01)

(52) U.S. Cl.
  CPC ............... *G06Q 50/01* (2013.01); *H04W 4/206* (2013.01)

(58) Field of Classification Search
  CPC .................................................... G06Q 50/01
  USPC ........................................................ 707/899
  See application file for complete search history.

(56) References Cited

U.S. PATENT DOCUMENTS

| | | | |
|---|---|---|---|
| 2009/0254887 A1* | 10/2009 | Rossi et al. | 717/126 |
| 2011/0142016 A1* | 6/2011 | Chatterjee | 370/338 |
| 2012/0143791 A1* | 6/2012 | Sathish | 706/12 |
| 2012/0179973 A1* | 7/2012 | Brolley et al. | 715/738 |
| 2012/0290583 A1* | 11/2012 | Mahaniok et al. | 707/741 |

* cited by examiner

*Primary Examiner* — Hosain Alam
*Assistant Examiner* — Van Oberly
(74) *Attorney, Agent, or Firm* — Mauriel Kapouytian Woods LLP; Andrew A. Noble; James Woods (57) ABSTRACT

Methods and systems for recommending social networking connections are disclosed. Information is received from a mobile device relating to software applications that are installed on a first user's mobile device. A weight for each software application is calculated based on usage information and each software application is designated to at least one category. A priority is calculated for each category based at least in part on respective weights of software applications designated to the category. A second user, who is not connected to the first user, is detected, wherein the second user has a predetermined number of categories that are the same as the first user's categories, and wherein priorities corresponding to the second user's categories are within a predetermined range of priorities corresponding to the first user's categories. A recommendation to connect with the second user is provided to the first user.

18 Claims, 5 Drawing Sheets

METHODS AND SYSTEMS FOR RECOMMENDING SOCIAL NETWORK CONNECTIONS

BACKGROUND

Sales of internet-enabled mobile devices, such as smartphones, tablets, e-readers, etc. have experienced tremendous growth over the last few years. What's more, sales of mobile devices are projected to grow even further in the coming years. These devices have created a shift in personal computing. While desktop and laptop computers are typically a shared resource in a family, business, or school setting, mobile devices are highly personal to the owner.

In addition, social networking has grown in popularity in recent years. There is a need for improved techniques in determining user interests to improve users' social networking experience.

SUMMARY

Some embodiments of the invention provide systems and methods for providing recommendations for social network connections. Information relating to one or more software applications that are installed on a first user's mobile device is received at a server computer, the information comprising usage information corresponding to each software application of the one or more software applications, wherein the first user is a member of a social network. The information may include for example, a list of titles and/or IDs of the one or more software applications and the corresponding install dates (e.g., the date the application was installed on the mobile device) of those applications. The usage information may include for example, the duration of time each of the one or more applications was accessed per week, the duration of time each of the one or more applications was used per week, the duration of time since the application was last accessed, etc. It will be apparent to one of ordinary skill in the art that a number of other metrics may be used to specify the usage information and that the usage information may be specified in seconds, minutes, hours, days, etc. and may be obtained for any time periods, such as weekly, daily, monthly, etc. In one embodiment, the information may be received in one or more data packets transmitted by a software application running on the mobile device. In one embodiment, the software application may be configured to transmit the information periodically (e.g., every week). Alternatively, or in addition, the software application may be configured to transmit the information when requested by the server computer. In some embodiments, the information may also include identification information of the user. In some embodiments, the identification information may be used at the server computer to create, retrieve or modify user profile information for the user.

A weight for each software application of the one or more software applications may be calculated based at least in part on the corresponding usage information. For example, in one embodiment, the weight may be calculated as:

Weight_Factor=(number of minutes accessed/week)+ ((number of minutes used/week)*(application complexity adjustment))−(time since application was last accessed in days)

Each software application of the one or more software applications may be designated to at least one category based at least in part on a genre of the software application. For example, if applications A1-A10 are installed on mobile device, they may be categorized as A1 and A3 fall in category C1, A2, A4, A6, A8, and A9 fall in category C2, and A5, A7 and A10 fall in category C3. C1, C2 and C3 may correspond to genres such as, sports, games, and utilities, respectively. It should be noted that some applications may be assigned to multiple categories. Alternatively, or in addition, the one or more applications may be categorized based on time of day usage. For example, applications may be categorized as "morning" applications, "afternoon" applications, or "evening" applications.

A priority for each category may be calculated based at least in part on respective weights of software applications designated to the category. In one embodiment, the priority for a category may be calculated by summing the respective weights of the applications designed to that category. Using the above example, the priority for category C1 would be Priority of C1=Weight of A1+Weight of A3.

A second user of the social network who is not connected to the first user may be detected, wherein the second user has a predetermined number of categories that are the same as the first user's categories, and wherein priorities corresponding to the second user's categories are within a predetermined range of priorities corresponding to the first user's categories. For example, one or more users that have a predetermined number of categories in common with the first user, and whose priorities for those categories fall within a predetermined range (e.g., ±10%) may be detected. Using the above example, the first user has applications A1-A10, which fall into categories C1-C3. If a second user has applications A1-A5 which fall into categories C1 and C2, and if the priorities of C1 and C2 for the second user are within 10% of the priorities of C1 and C2 for the first user, then the second user may be detected.

A recommendation may be provided to the first user to connect with the second user. Based on the detection of the second user, the second user may be recommended to the first user as a social network connection.

BRIEF DESCRIPTION OF THE DRAWINGS

The systems and methods described herein may be better understood with reference to the following drawings and detailed description. Non-limiting and non-exhaustive embodiments are described with reference to the following drawings.

DETAILED DESCRIPTION

Figure 1:
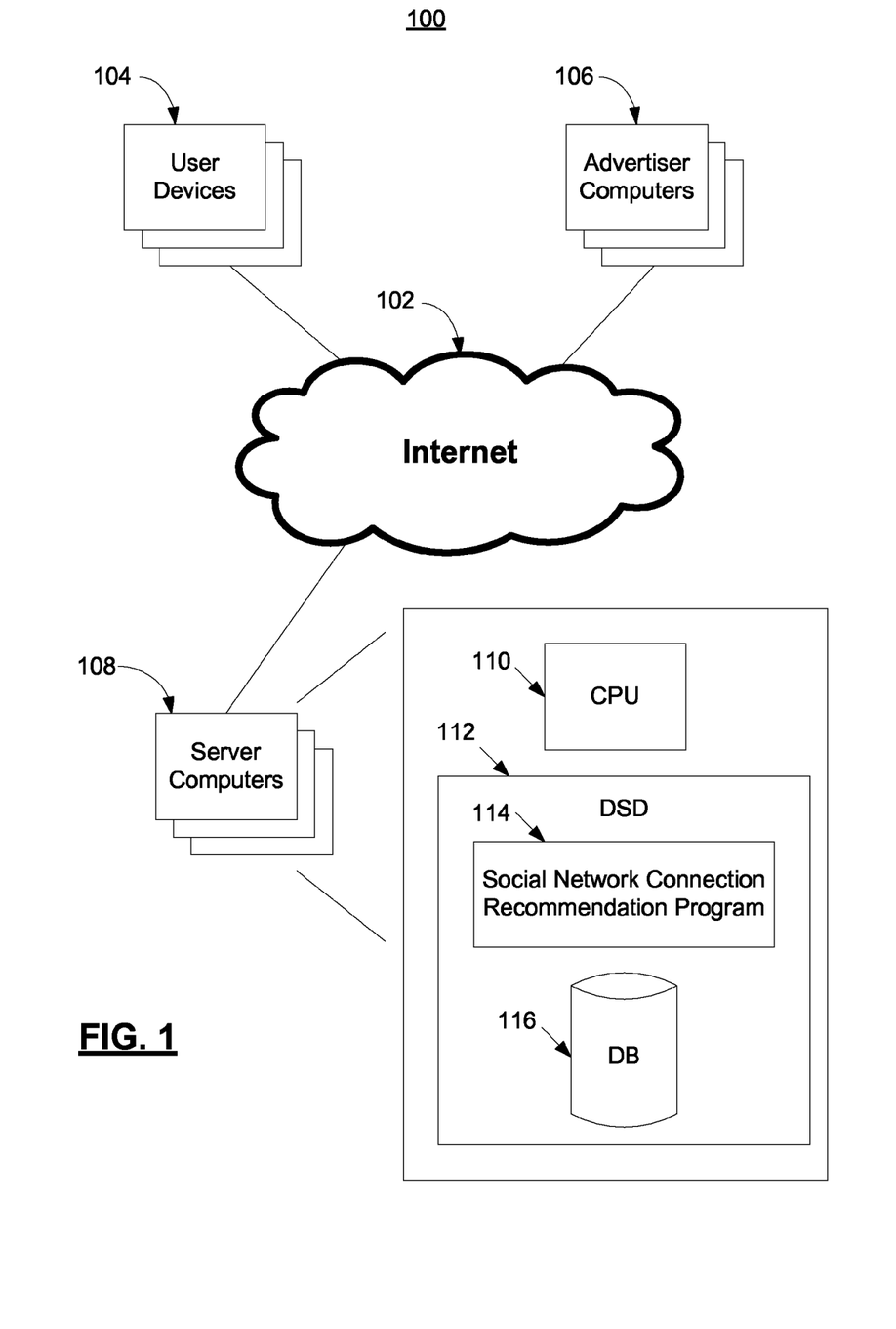
FIG. 1 is an exemplary distributed computer system according to one embodiment of the invention.

FIG. 1 is a distributed computer system 100 according to one embodiment of the invention. The system 100 includes user devices 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user devices 104 may be or include netbook and laptop PCs, as well as, wireless, mobile, or handheld devices such as smartphones, PDAs, tablets, e-readers, etc.

Each of the one or more computers 106 and 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Social Network Connection Recommendation Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
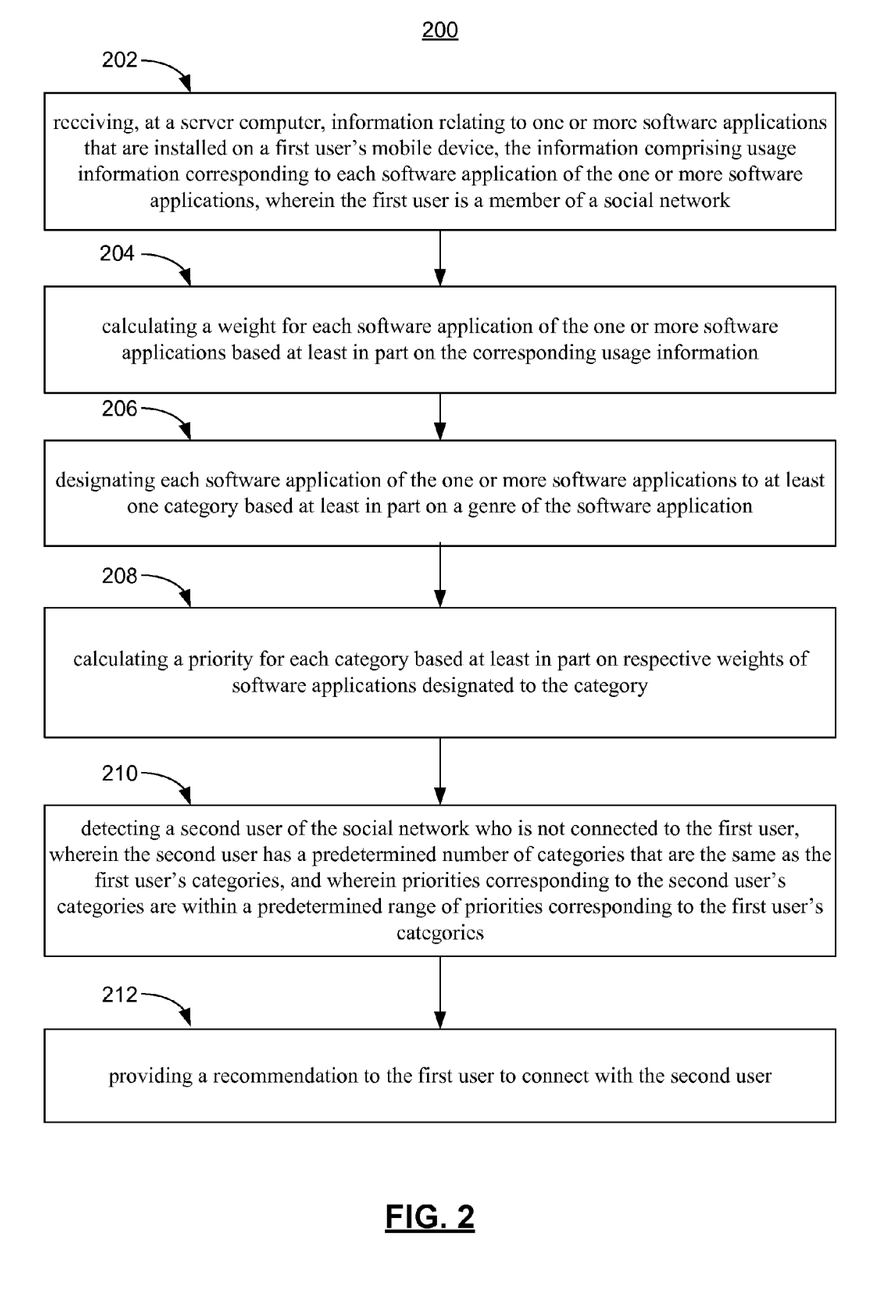
FIG. 2 is an exemplary flow diagram illustrating a method according to one embodiment of the invention.

FIG. 2 is a flow diagram illustrating a method 200 according to one embodiment of the invention. At step 202, information relating to one or more software applications that are installed on a first user's mobile device is received at a server computer, the information comprising usage information corresponding to each software application of the one or more software applications, wherein the first user is a member of a social network. The information may include for example, a list of titles and/or IDs of the one or more software applications and the corresponding install dates (e.g., the date the application was installed on the mobile device) of those applications. The usage information may include for example, the duration of time each of the one or more applications was accessed per week, the duration of time each of the one or more applications was used per week, the duration of time since the application was last accessed, etc. It will be apparent to one of ordinary skill in the art that a number of other metrics may be used to specify the usage information and that the usage information may be specified in seconds, minutes, hours, days, etc. and may be obtained for any time periods, such as weekly, daily, monthly, etc. In one embodiment, the information may be received in one or more data packets transmitted by a software application running on the mobile device. In one embodiment, the software application may be configured to transmit the information periodically (e.g., every week). Alternatively, or in addition, the software application may be configured to transmit the information when requested by the server computer. In some embodiments, the information may also include identification information of the user. In some embodiments, the identification information may be used at the server computer to create, retrieve or modify user profile information for the user.

At step 204, a weight for each software application of the one or more software applications may be calculated based at least in part on the corresponding usage information. For example, in one embodiment, the weight may be calculated as:

Weight_Factor=(number of minutes accessed/week)+((number of minutes used/week)*(application complexity adjustment))−(time since application was last accessed in days)

The number of minutes accessed per week corresponds to the number of minutes the application was open (e.g., started) per week. The number of minutes used per week corresponds to the duration (in minutes) the application was used per week. Application complexity adjustment corresponds to the complexity of the application. For example, it may be assigned a value of 1 for a simple application, 0.6 for a moderate application, and 0.2 for a complex application. Time since application was last accessed corresponds to the number of days since the application was last accessed (e.g., opened or started).

At step 206, each software application of the one or more software applications may be designated to at least one category based at least in part on a genre of the software application. For example, if applications A1-A10 are installed on mobile device, they may be categorized as A1 and A3 fall in category C1, A2, A4, A6, A8, and A9 fall in category C2, and A5, A7 and A10 fall in category C3. C1, C2 and C3 may correspond to genres such as, sports, games, and utilities, respectively. It should be noted that some applications may be assigned to multiple categories. Alternatively, or in addition, the one or more applications may be categorized based on time of day usage. For example, applications may be categorized as "morning" applications, "afternoon" applications, or "evening" applications.

At step 208, a priority for each category may be calculated based at least in part on respective weights of software applications designated to the category. In one embodiment, the priority for a category may be calculated by summing the respective weights of the applications designed to that category. Using the above example, the priority for category C1 would be Priority of C1=Weight of A1+Weight of A3.

At step 210, a second user of the social network who is not connected to the first user may be detected, wherein the second user has a predetermined number of categories that are the same as the first user's categories, and wherein priorities corresponding to the second user's categories are within a predetermined range of priorities corresponding to the first user's categories. For example, one or more users that have a predetermined number of categories in common with the first user, and whose priorities for those categories fall within a predetermined range (e.g., ±10%) may be detected. Using the above example, the first user has applications A1-A10, which fall into categories C1-C3. If a second user's mobile device has applications A1-A5 which fall into categories C1 and C2, and if the priorities of C1 and C2 for the second user are within 10% of the priorities of C1 and C2 for the first user, then the second user may be detected.

At step 212, a recommendation may be provided to the first user to connect with the second user. Based on the detection of the second user, the second user may be recommended to the first user as a social network connection.

Figure 3:
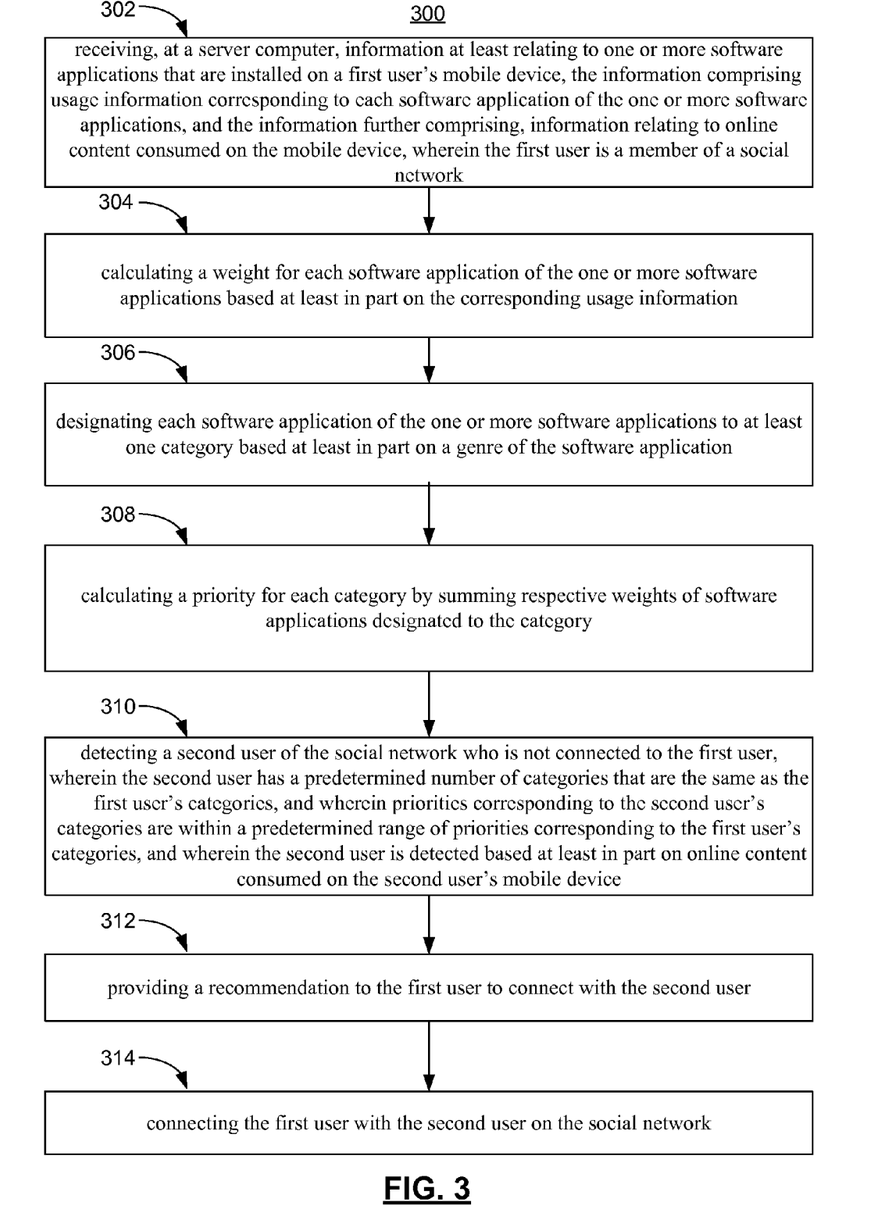
FIG. 3 is an exemplary flow diagram illustrating a method according to one embodiment of the invention.

FIG. 3 is a flow diagram illustrating a method 300 according to one embodiment of the invention. At step 302, information at least relating to one or more software applications that are installed on a first user's mobile device is received at a server computer, the information comprising usage information corresponding to each software application of the one or more software applications, and the information further comprising, information relating to online content consumed on the mobile device, wherein the first user is a member of a social network. The information may include for example, a list of titles and/or IDs of the one or more software applications and the corresponding install dates (e.g., the date the application was installed on the mobile device) of those applications. The usage information may include for example, the duration of time each of the one or more applications was accessed per week, the duration of time each of the one or more applications was used per week, the duration of time since the application was last accessed, etc. It will be apparent to one of ordinary skill in the art that a number of other metrics may be used to specify the usage information and that the usage information may be specified in seconds, minutes, hours, days, etc. and may be obtained for any time periods, such as weekly, daily, monthly, etc. In one embodiment, the information may be received in one or more data packets transmitted by a software application running on the mobile device. In one embodiment, the software application may be configured to transmit the information periodically (e.g., every week). Alternatively, or in addition, the software application may be configured to transmit the information when requested by the server computer. In some embodiments, the information may also include identification information of the user. In some embodiments, the identification information may be used at the server computer to create, retrieve or modify user profile information for the user. The information relating to online content consumed on the mobile device may include information relating to one or more of for example, webpages visited, RSS feeds subscribed to, and comments written or posted by the first user, etc.

At step 304, a weight for each software application of the one or more software applications may be calculated based at least in part on the corresponding usage information. For example, in one embodiment, the weight may be calculated as:

Weight_Factor=(number of minutes accessed/week)+
((number of minutes used/week)*(application
complexity adjustment))−(time since application
was last accessed in days)

The number of minutes accessed per week corresponds to the number of minutes the application was open (e.g., started) per week. The number of minutes used per week corresponds to the duration (in minutes) the application was used per week. Application complexity adjustment corresponds to the complexity of the application. For example, it may be assigned a value of 1 for a simple application, 0.6 for a moderate application, and 0.2 for a complex application. Time since application was last accessed corresponds to the number of days since the application was last accessed (e.g., opened or started).

At step 306, each software application of the one or more software applications may be designated to at least one category based at least in part on a genre of the software application. For example, if applications A1-A10 are installed on mobile device, they may be categorized as A1 and A3 fall in category C1, A2, A4, A6, A8, and A9 fall in category C2, and A5, A7 and A10 fall in category C3. C1, C2 and C3 may correspond to genres such as, sports, games, and utilities, respectively. It should be noted that some applications may be assigned to multiple categories. Alternatively, or in addition, the one or more applications may be categorized based on time of day usage. For example, applications may be categorized as "morning" applications, "afternoon" applications, or "evening" applications.

At step 308, a priority for each category may be calculated based at least in part on respective weights of software applications designated to the category. In one embodiment, the priority for a category may be calculated by summing the respective weights of the applications designed to that category. Using the above example, the priority for category C1 would be Priority of C1=Weight of A1+Weight of A3.

At step 310, a second user of the social network who is not connected to the first user may be detected, wherein the second user has a predetermined number of categories that are the same as the first user's categories, and wherein priorities corresponding to the second user's categories are within a predetermined range of priorities corresponding to the first user's categories and wherein the second user is detected based at least in part on online content consumed on the second user's mobile device. For example, one or more users that have a predetermined number of categories in common with the first user, and whose priorities for those categories fall within a predetermined range (e.g., ±10%) may be detected. Using the above example, the first user has applications A1-A10, which fall into categories C1-C3. If a second user's mobile device has applications A1-A5 which fall into categories C1 and C2, and if the priorities of C1 and C2 for the second user are within 10% of the priorities of C1 and C2 for the first user, then the second user may be detected. In addition, the second user may be detected based at least in part on the online content consumed on the second user's mobile device. For example the second user may be detected based at least in part on information relating to one or more of for example, webpages visited, RSS feeds subscribed to, and comments written or posted by the second user, etc.

At step 312, a recommendation may be provided to the first user to connect with the second user. Based on the detection of the second user, the second user may be recommended to the first user as a social network connection. At step 314, the first user may be connected to the second user on the social network.

Figure 4:
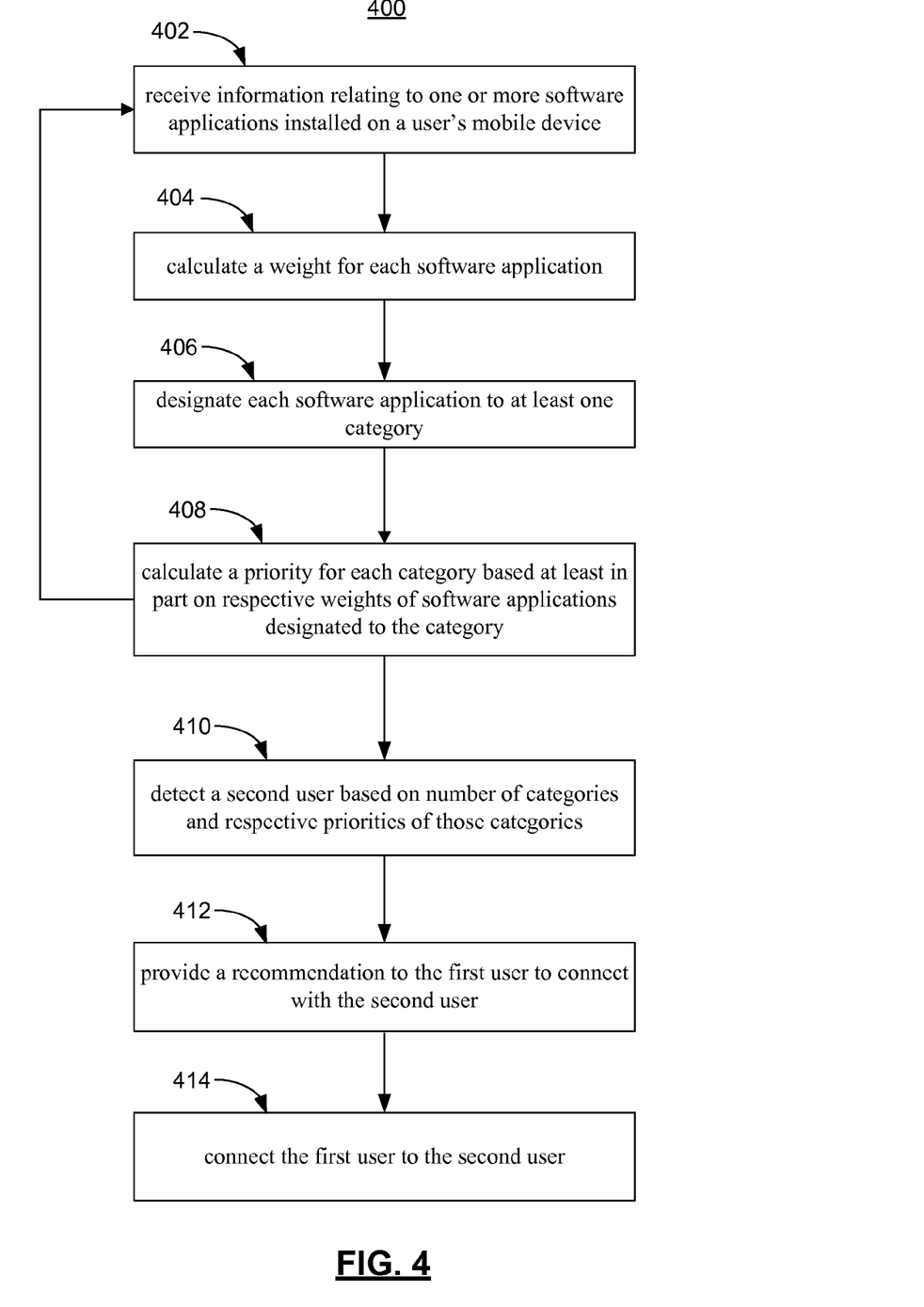
FIG. 4 is an exemplary flow diagram illustrating a method according to one embodiment of the invention.

FIG. 4 is a flow diagram illustrating a method 400 according to one embodiment of the invention. At step 402, information at least relating to one or more software applications that are installed on a first user's mobile device is received at a server computer. The first user may be a member of a social network (e.g., Facebook™, Linkedin™, etc.). In some embodiments, the information may comprise usage information corresponding to each software application of the one or more software applications. The information may include for example, a list of titles and/or IDs of the one or more software applications and the corresponding install dates (e.g., the date the application was installed on the mobile device) of those applications. The usage information may include for example, the duration of time each of the one or more applications was accessed per week, the duration of time each of the one or more applications was used per week, the duration of time since the application was last accessed, etc. It will be apparent to one of ordinary skill in the art that a number of other metrics may be used to specify the usage information and that the usage information may be specified in seconds, minutes, hours, days, etc. and may be obtained for any time periods, such as weekly, daily, monthly, etc. In addition, the information may comprise information relating to online content consumed on the mobile device. The information relating to online content consumed on the mobile device may include information relating to one or more of for example, webpages visited, RSS feeds subscribed to, and comments written or posted by the first user, etc. In one embodiment, the information may be received in one or more data packets transmitted by a software application running on the mobile device. In one embodiment, the software application may be configured to transmit the information periodically (e.g., every week). Alternatively, or in addition, the software application may be configured to transmit the information when requested by the server computer. In some embodiments, the information may also include identification information of the user. In some embodiments, the identification information may be used at the server computer to create, retrieve or modify user profile information for the user.

At step 404, a weight for each software application of the one or more software applications may be calculated. In one embodiment, the weight may be based at least in part on the corresponding usage information for each software application. For example, in one embodiment, the weight may be calculated as:

> Weight_Factor=(number of minutes accessed/week)+ ((number of minutes used/week)*(application complexity adjustment))−(time since application was last accessed in days)

The number of minutes accessed per week corresponds to the number of minutes the application was open (e.g., started) per week. The number of minutes used per week corresponds to the duration (in minutes) the application was used per week. Application complexity adjustment corresponds to the complexity of the application. For example, it may be assigned a value of 1 for a simple application, 0.6 for a moderate application, and 0.2 for a complex application. Time since application was last accessed corresponds to the number of days since the application was last accessed (e.g., opened or started).

At step 406, each software application of the one or more software applications may be designated to at least one category. In one embodiment, the categories may be selected based at least in part on a genre of the software application. For example, if applications A1-A10 are installed on mobile device, they may be categorized as A1 and A3 fall in category C1, A2, A4, A6, A8, and A9 fall in category C2, and A5, A7 and A10 fall in category C3. C1, C2 and C3 may correspond to genres such as sports, games, and utilities, respectively. It should be noted that some applications may be assigned to multiple categories. Alternatively, or in addition, the one or more applications may be categorized based on time of day usage. For example, applications may be categorized as "morning" applications, "afternoon" applications, or "evening" applications.

At step 408, a priority for each category may be calculated based at least in part on respective weights of software applications designated to the category. In one embodiment, the priority for a category may be calculated by summing the respective weights of the applications designed to that category. Using the above example, the priority for category C1 would be Priority of C1=Weight of A1+Weight of A3. Steps 402-408 of method 400 may be performed for one or more other users of the social network in order to determine categories and corresponding priorities for one or more software applications installed on their respective mobile devices.

At step 410, a second user of the social network who is not connected to the first user may be detected based at least in part on a number of categories and corresponding priorities. In one embodiment, the second user has a predetermined number of categories that are the same as the first user's categories, and wherein priorities corresponding to the second user's categories are within a predetermined range of priorities corresponding to the first user's categories. For example, one or more users that have a predetermined number of categories in common with the first user, and whose priorities for those categories fall within a predetermined range (e.g., ±10%) may be detected. Using the above example, the first user has applications A1-A10, which fall into categories C1-C3. If a second user's mobile device has applications A1-A5 which fall into categories C1 and C2, and if the priorities of C1 and C2 for the second user are within 10% of the priorities of C1 and C2 for the first user, then the second user may be detected. In addition, the second user may be detected based at least in part on the online content consumed on the second user's mobile device. For example the second user may be detected based at least in part on information relating to one or more of for example, webpages visited, RSS feeds subscribed to, and comments written or posted by the second user, etc. In other words, for a second user to be detected, the second user may need to have a predetermined number of categories in common with the first user, have priorities for those categories within a predetermined range of the priorities for the first user's categories, and have a predetermined amount of consumed online content be at least similar to the online content consumed on the first user's mobile device.

At step 412, a recommendation may be provided to the first user to connect with the second user. Based on the detection of the second user, the second user may be recommended to the first user as a social network connection. At step 414, the first user may be connected to the second user on the social network. In one embodiment, the first user may have to accept the recommendation in order to be connected to the second user.

Figure 5:
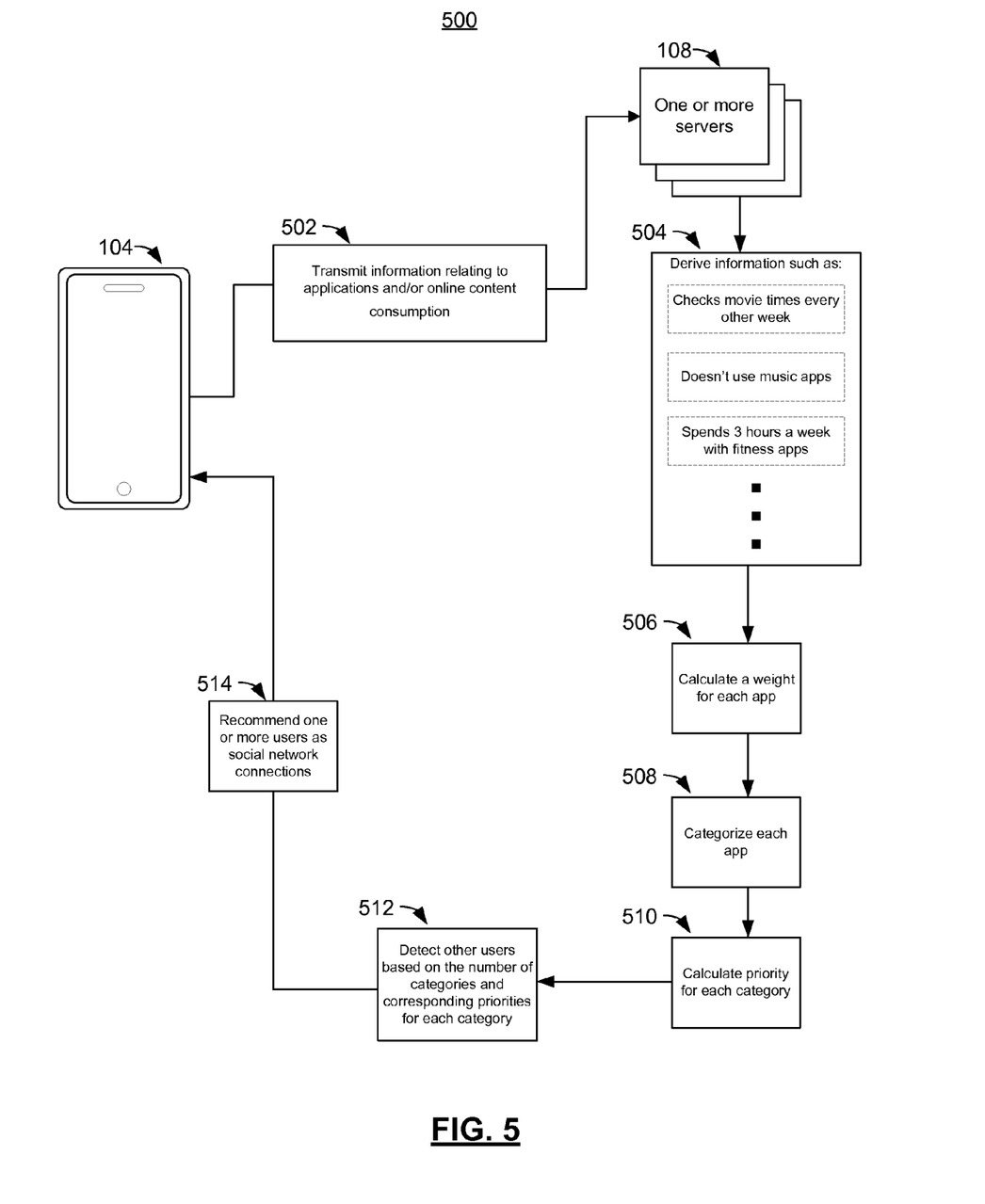
FIG. 5 is an exemplary block diagram according to one embodiment of the invention.

FIG. 5 illustrates a block diagram of a system 500 according to one embodiment of the invention. Mobile device 104, which may be a smartphone, e-reader, tablet, etc. is depicted. As depicted in block 502, mobile device 104 may transmit to one or more servers 108, information relating to applications installed on mobile device 104 and/or information relating to online content consumed on mobile device 104. As previously discussed, the information relating to the applications may include usage information. The information relating to online content consumption may include for example, webpages visited, RSS feeds subscribed to, and comments written or posted using mobile device 104. The information transmitted from mobile device 104 may be transmitted by a software application running on mobile device 104. In one embodiment, the software application may be configured to transmit the information periodically (e.g., every week). Alternatively, or in addition, the software application may be configured to transmit the information when requested by the server computer. In some embodiments, the information may also include identification information of the user. In some embodiments, the identification information may be used at the server computer to create, retrieve or modify user profile information for the user.

As depicted in block 504, one or more server computers 108 may receive the information and using the received information may derive information such as, for example user checks movie times every other week, user doesn't user music applications, user spends three hours a week with fitness applications, etc.

At block 506, one or more server computers 108 may calculate a weight for each software application of the one or more software applications. In one embodiment, as previously discussed, the weight may be based at least in part on the corresponding usage information for each software application. For example, in one embodiment, the weight may be calculated as:

> Weight_Factor=(number of minutes accessed/week)+ ((number of minutes used/week)*(application complexity adjustment))−(time since application was last accessed in days)

At block 508, one or more server computers 108 may designate each software application of the one or more software applications to at least one category. In one embodiment, the categories may be selected based at least in part on a genre of the software application. It should be noted that some applications may be assigned to multiple categories. Alternatively, or in addition, the one or more applications may be categorized based on time of day usage. For example, applications may be categorized as "morning" applications, "afternoon" applications, or "evening" applications.

At block 510, one or more server computers 108 may calculate a priority for each category based at least in part on respective weights of software applications designated to the category. In one embodiment, the priority for a category may be calculated by summing the respective weights of the applications designed to that category.

At block 512, one or more server computers 108 may detect a second user of the social network, who is not connected to the first user, based at least in part on a number of categories and corresponding priorities. In one embodiment, the second user has a predetermined number of categories that are the same as the first user's categories, and wherein priorities corresponding to the second user's categories are within a predetermined range of priorities corresponding to the first user's categories. For example, one or more users that have a predetermined number of categories in common with the first user, and whose priorities for those categories fall within a predetermined range (e.g., ±10%) may be detected. In addition, the second user may be detected based at least in part on the online content consumed on the second user's mobile device. For example the second user may be detected based at least in part on information relating to one or more of for example, webpages visited, RSS feeds subscribed to, and comments written or posted by the second user, etc. In other words, for a second user to be detected, the second user may need to have a predetermined number of categories in common with the first user, have priorities for those categories within a predetermined range of the priorities for the first user's categories, and have a predetermined amount of consumed online content be at least similar to the online content consumed on the first user's mobile device.

At block 514, one or more server computers 108 may provide a recommendation to the first user to connect with the second user. Based on the detection of the second user, the second user may be recommended to the first user as a social network connection.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

The invention claimed is:

1. A method comprising:
    receiving, at a server computer, information relating to one or more software applications that are installed on a first user's mobile device, the information comprising usage information corresponding to each software application of the one or more software applications and information relating to online content consumed on the first user's mobile device, wherein the first user is a member of a social network;
    deriving information based on usage information corresponding to one or more of the software applications, wherein deriving information includes determining an access pattern, usage duration pattern or non-usage pattern for a software application based on the usage information, and wherein determining the usage duration pattern includes adjusting a usage duration value by a value corresponding to a determined complexity of the software application;
    calculating a weight for each software application of the one or more software applications based at least in part on the corresponding usage information and the derived information;
    designating each software application of the one or more software applications to at least one category based at least in part on a genre of the software application;
    calculating a priority for each category based at least in part on respective weights of software applications designated to the category;
    detecting a second user of the social network who is not connected to the first user, the detecting based on the second user having a predetermined number of categories corresponding to the first user's categories, priorities corresponding to the second user's categories being within a predetermined range of priorities corresponding to the first user's categories, and a predetermined amount of online content consumed on a mobile device of the second user being in common with the online content consumed on the first user's mobile device; and
    providing a recommendation to the first user to connect with the second user.

2. The method of claim 1, wherein the information includes a title of each software application of the one or more software applications.

3. The method of claim 1, wherein the usage information comprises one or more of a time duration during which each software application of the one or more software applications was used by the first user over a predetermined time period, a time duration during which each software application of the one or more software applications was accessed by the first user over a predetermined time period, and a time duration since each software application of the one or more software applications was last accessed by the first user.

4. The method of claim 1, further comprising:
    categorizing each software application of the one or more software applications based at least in part on a time of day each software application of the one or more software applications is used by the first user.

5. The method of claim 1, wherein calculating the priority for each category comprises summing the respective weights of software applications designated to the category.

6. The method of claim 1, wherein the information relating to the online content comprises one or more of webpages visited, RSS feeds subscribed to, and comments written by the first user.

7. The method of claim 1, further comprising:
    connecting the first user with the second user on the social network.

8. The method of claim 1, wherein deriving information includes identifying a category of software applications that the first user does not use based on the usage information.

9. A system comprising:
    one or more server computers coupled to a network; and
    one or more databases coupled to the one or more server computers;
    wherein the one or more server computers are for:
    receiving information relating to one or more software applications that are installed on a first user's mobile device, the information comprising usage information corresponding to each software application of the one or more software applications and information relating to online content consumed on the first user's mobile device, wherein the first user is a member of a social network;
    deriving information based on usage information corresponding to one or more of the software applications, wherein deriving information includes determining an access pattern, usage duration pattern or non-usage pattern for a software application based on the usage information, and wherein determining the usage duration pattern includes adjusting a usage duration value by a value corresponding to a determined complexity of the software application;

calculating a weight for each software application of the one or more software applications based at least in part on the corresponding usage information and the derived information;

designating each software application of the one or more software applications to at least one category based at least in part on a genre of the software application;

calculating a priority for each category based at least in part on respective weights of software applications designated to the category;

detecting a second user of the social network who is not connected to the first user, the detecting based on the second user having a predetermined number of categories corresponding to the first user's categories, priorities corresponding to the second user's categories being within a predetermined range of priorities corresponding to the first user's categories, and a predetermined amount of online content consumed on a mobile device of the second user being in common with the online content consumed on the first user's mobile device; and providing a recommendation to the first user to connect with the second user.

10. The system of claim 9, wherein the information includes a title of each software application of the one or more software applications.

11. The system of claim 9, wherein the usage information comprises one or more of a time duration during which each software application of the one or more software applications was used by the first user over a predetermined time period, a time duration during which each software application of the one or more software applications was accessed by the first user over a predetermined time period, and a time duration since each software application of the one or more software applications was last accessed by the first user.

12. The system of claim 9, wherein the one or more server computers are further configured for:
categorizing each software application of the one or more software applications based at least in part on a time of day each software application of the one or more software applications is used by the first user.

13. The system of claim 9, wherein calculating the priority for each category comprises summing the respective weights of software applications designated to the category.

14. The system of claim 9, wherein the information relating to the online content comprises one or more of webpages visited, RSS feeds subscribed to, and comments written by the first user.

15. The system of claim 9, wherein the one or more server computers are further configured for:
connecting the first user with the second user on the social network.

16. The system of claim 9, wherein the mobile device is one or more of a smart phone, e-reader, and tablet.

17. The system of claim 9, wherein deriving information includes identifying a category of software applications that the first user does not use based on the usage information.

18. A non-transitory computer readable medium having stored thereon instructions for causing a computer to execute a method, the method comprising:
receiving, at a server computer, information relating to one or more software applications that are installed on a first user's mobile device, the information comprising usage information corresponding to each software application of the one or more software applications and information relating to online content consumed on the first user's mobile device, wherein the first user is a member of a social network;

deriving information based on usage information corresponding to one or more of the software applications, wherein deriving information includes determining an access pattern, usage duration pattern or non-usage pattern for a software application based on the usage information, and wherein determining the usage duration pattern includes adjusting a usage duration value by a value corresponding to a determined complexity of the software application;

calculating a weight for each software application of the one or more software applications based at least in part on the corresponding usage information and the derived information;

designating each software application of the one or more software applications to at least one category based at least in part on a genre of the software application;

calculating a priority for each category by summing respective weights of software applications designated to the category;

detecting a second user of the social network who is not connected to the first user, the detecting based on the second user having a predetermined number of categories corresponding to the first user's categories, priorities corresponding to the second user's categories being within a predetermined range of priorities corresponding to the first user's categories, and a predetermined amount of online content consumed on a mobile device of the second user being in common with the online content consumed on the first user's mobile device;

providing a recommendation to the first user to connect with the second user; and connecting the first user with the second user on the social network.

* * * * *